(12) United States Patent
Goto

(10) Patent No.: US 9,610,950 B2
(45) Date of Patent: Apr. 4, 2017

(54) VEHICLE TRAVEL CONTROL APPARATUS

(75) Inventor: Hiroki Goto, Susono (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/385,052

(22) PCT Filed: Mar. 15, 2012

(86) PCT No.: PCT/JP2012/056759
§ 371 (c)(1),
(2), (4) Date: Sep. 12, 2014

(87) PCT Pub. No.: WO2013/136495
PCT Pub. Date: Sep. 19, 2013

(65) Prior Publication Data
US 2015/0025768 A1 Jan. 22, 2015

(51) Int. Cl.
*B60W 30/18* (2012.01)
*B60W 30/16* (2012.01)
(Continued)

(52) U.S. Cl.
CPC ......... *B60W 30/18* (2013.01); *B60K 31/0008* (2013.01); *B60W 30/16* (2013.01);
(Continued)

(58) Field of Classification Search
CPC ........ B60K 31/0008; B60K 2031/0025; B60K 2310/266; B60Y 2400/3017; B60W 30/16;
(Continued)

(56) References Cited

U.S. PATENT DOCUMENTS 7,026,976 B1 * 4/2006 Higashida ...................... 342/70
7,825,849 B2 * 11/2010 Tsuchida et al. ............... 342/70
(Continued)

FOREIGN PATENT DOCUMENTS

DE 102005032182 A1 1/2007
EP 1547847 A2 6/2005
(Continued)

OTHER PUBLICATIONS

International Search Report of PCT/JP2012/056759, dated May 1, 2012. [PCT/ISA/210].

*Primary Examiner* — Adam Tissot
*Assistant Examiner* — Tamara Weber
(74) *Attorney, Agent, or Firm* — Sughrue Mion, PLLC

(57) ABSTRACT

Provided is a vehicle travel control apparatus, mounted on a host vehicle, which performs travel control of the host vehicle on the basis of a positional relationship between the host vehicle and a preceding vehicle traveling ahead of the host vehicle, the vehicle travel control apparatus including a millimeter wave sensor that acquires target data of the preceding vehicle by receiving a reflected wave of an emitted electromagnetic wave; and an ECU that determines the presence or absence of a preceding vehicle traveling directly ahead of the host vehicle on the basis of the target data acquired by the millimeter wave sensor and that performs acceleration and deceleration control of the host vehicle on the basis of the presence or absence of the preceding vehicle. The ECU performs the acceleration and deceleration control of the host vehicle so that the acceleration or deceleration is suppressed in a case of the occurrence of target misidentification in which the millimeter wave sensor acquires a plurality of pieces of target data with respect to the same object.

1 Claim, 5 Drawing Sheets

(51) Int. Cl.
    *B60K 31/00*     (2006.01)
    *G01S 13/93*     (2006.01)
    *F02D 29/02*     (2006.01)
    *B60W 50/02*     (2012.01)

(52) U.S. Cl.
    CPC .... *G01S 13/931* (2013.01); *B60K 2031/0016* (2013.01); *B60K 2031/0025* (2013.01); *B60K 2310/266* (2013.01); *B60W 2050/0215* (2013.01); *B60W 2420/52* (2013.01); *B60W 2720/106* (2013.01); *B60Y 2400/3017* (2013.01); *F02D 29/02* (2013.01)

(58) Field of Classification Search
    CPC ............. B60W 30/18; B60W 2420/52; B60W 2720/106; F02D 29/02; G01S 13/931
    See application file for complete search history.

(56) References Cited

U.S. PATENT DOCUMENTS 8,125,372 B2* 2/2012 Focke et al. .................... 342/70

| | | | |
|---|---|---|---|
| 2001/0039472 A1* | 11/2001 | Isogai | B60K 31/0008 701/96 |
| 2003/0090409 A1 | 5/2003 | Tokutsu et al. | |
| 2003/0218564 A1* | 11/2003 | Tamatsu et al. | 342/70 |
| 2005/0143895 A1 | 6/2005 | Kato | |
| 2006/0091654 A1* | 5/2006 | De Mersseman et al. | 280/735 |
| 2007/0146196 A1* | 6/2007 | Oka et al. | 342/70 |
| 2013/0002470 A1* | 1/2013 | Kambe et al. | 342/55 |
| 2013/0030666 A1* | 1/2013 | Kato | 701/70 |
| 2013/0144502 A1* | 6/2013 | Shida | 701/96 |
| 2013/0253750 A1* | 9/2013 | Otake | 701/22 |
| 2015/0006028 A1* | 1/2015 | Strauss | 701/36 |

FOREIGN PATENT DOCUMENTS

| | | |
|---|---|---|
| JP | 2000038121 A | 2/2000 |
| JP | 2003-149337 A | 5/2003 |
| JP | 2004-9831 A | 1/2004 |
| JP | 2004-17763 A | 1/2004 |
| JP | 2005-186813 A | 7/2005 |
| JP | 2008-45974 A | 2/2008 |
| JP | 2009-73315 A | 4/2009 |

\* cited by examiner

VEHICLE TRAVEL CONTROL APPARATUS

CROSS REFERENCE TO RELATED APPLICATIONS

This application is a National Stage of International Application No. PCT/JP2012/056759 filed Mar. 15, 2012, the contents of all of which are incorporated herein by reference in their entirety.

TECHNICAL FIELD

The present invention relates to a vehicle travel control apparatus.

BACKGROUND ART

Hitherto, there has been a known vehicle travel control apparatus that detects a target which is present ahead by performing signal processing by the emission of an electromagnetic wave to the front side and by the detection of the electromagnetic wave reflected from the front side to thereby perform the travel control of a host vehicle in order to avoid a collision with the detected object. In addition, for example, the following Patent Literature 1 (Japanese Unexamined Patent Application Publication No. 2003-149337) discloses an event which is referred to as so-called target misidentification in which it is determined that the same target is identified when it is determined that a plurality of uncombined radar targets detected currently have continuity with a radar target detected previously.

CITATION LIST

Patent Literature

[Patent Literature 1] Japanese Unexamined Patent Application Publication No. 2003-149337
[Patent Literature 2] Japanese Unexamined Patent Application Publication No. 2009-073315

SUMMARY OF INVENTION

Technical Problem

Incidentally, when the above-described target misidentification occurs, the number of positions of a radar target is two or more. Thus, for example, a preceding vehicle in a lane next to a lane in which a host vehicle is traveling may be erroneously detected, or non-detection may occur in which a preceding vehicle is not detected even in a case of the presence of the preceding vehicle traveling in a lane in which a host vehicle is traveling. For this reason, in the above-described vehicle travel control apparatus, the host vehicle may be decelerated due to the erroneous detection of the preceding vehicle in spite of the absence of the preceding vehicle, or the host vehicle may be accelerated due to the non-detection in spite of the presence of a preceding vehicle. Thus, following travel against a driver's wish is executed, which results in a problem in that an uncomfortable feeling is given to a driver.

Consequently, an object of the present invention is to provide a vehicle travel control apparatus capable of reducing a driver's uncomfortable feeling by appropriately performing travel control even when the erroneous detection or non-detection of a preceding vehicle occurs.

Solution to Problem

A vehicle travel control apparatus according to the present invention, having solved the above-described problem, is mounted on a host vehicle and performs travel control of the host vehicle on the basis of a positional relationship between the host vehicle and a preceding vehicle traveling ahead of the host vehicle. The vehicle travel control apparatus includes a radar detection unit that acquires target data of the preceding vehicle by receiving a reflected wave of an emitted electromagnetic wave; and a control unit that determines presence or absence of a preceding vehicle traveling directly ahead of the host vehicle from the target data acquired by the radar detection unit and performs acceleration and deceleration control of the host vehicle on the basis of the presence or absence of the preceding vehicle, the control unit performing the acceleration and deceleration control of the host vehicle so as to suppress acceleration and deceleration when target misidentification occurs in which a plurality of pieces of target data are acquired with respect to the same object by the radar detection unit.

In the vehicle travel control apparatus according to the present invention, the acceleration and deceleration of the host vehicle is suppressed when target misidentification occurs in which a plurality of pieces of target data are acquired with respect to the same object. Accordingly, even when the erroneous detection or non-detection of a preceding vehicle occurs due to the target misidentification, it is possible to reduce a driver's uncomfortable feeling by appropriately performing the travel control of the host vehicle.

In the vehicle travel control apparatus according to the present invention, the control unit performs the acceleration and deceleration control of the host vehicle so as to suppress deceleration in a case where it is determined that the preceding vehicle is currently present and that a preceding vehicle was not previously present when the target misidentification occurs. Accordingly, in a case where the target misidentification occurs, which is a case where there is a high possibility of the occurrence of the erroneous detection of a preceding vehicle in which it is determined that the preceding vehicle is currently present and that a preceding vehicle was not previously present, deceleration is suppressed by the control unit. Therefore, the host vehicle is controlled so as not to be decelerated when the erroneous detection of the preceding vehicle occurs. Thus, even in this case, it is possible to reduce a driver's uncomfortable feeling by appropriately performing travel control.

In the vehicle travel control apparatus according to the present invention, the control unit performs the acceleration and deceleration control of the host vehicle so as to suppress acceleration when the target misidentification occurs and when it is determined that a preceding vehicle is not currently present and that a preceding vehicle was previously present. Accordingly, when target misidentification occurs and when there is a high possibility of the occurrence of the non-detection of a preceding vehicle in which it is determined that a preceding vehicle is not currently present and that a preceding vehicle was previously present, acceleration is suppressed by the control unit. Therefore, the host vehicle is controlled so as not to be accelerated when the non-detection of the preceding vehicle occurs. Thus, even in this case, it is possible to reduce a driver's uncomfortable feeling by appropriately performing travel control.

Advantageous Effects of Invention

According to the present invention, even when the erroneous detection or non-detection of a preceding vehicle occurs, it is possible to reduce a driver's uncomfortable feeling by appropriately performing travel control.

DESCRIPTION OF EMBODIMENTS

Figure 1:
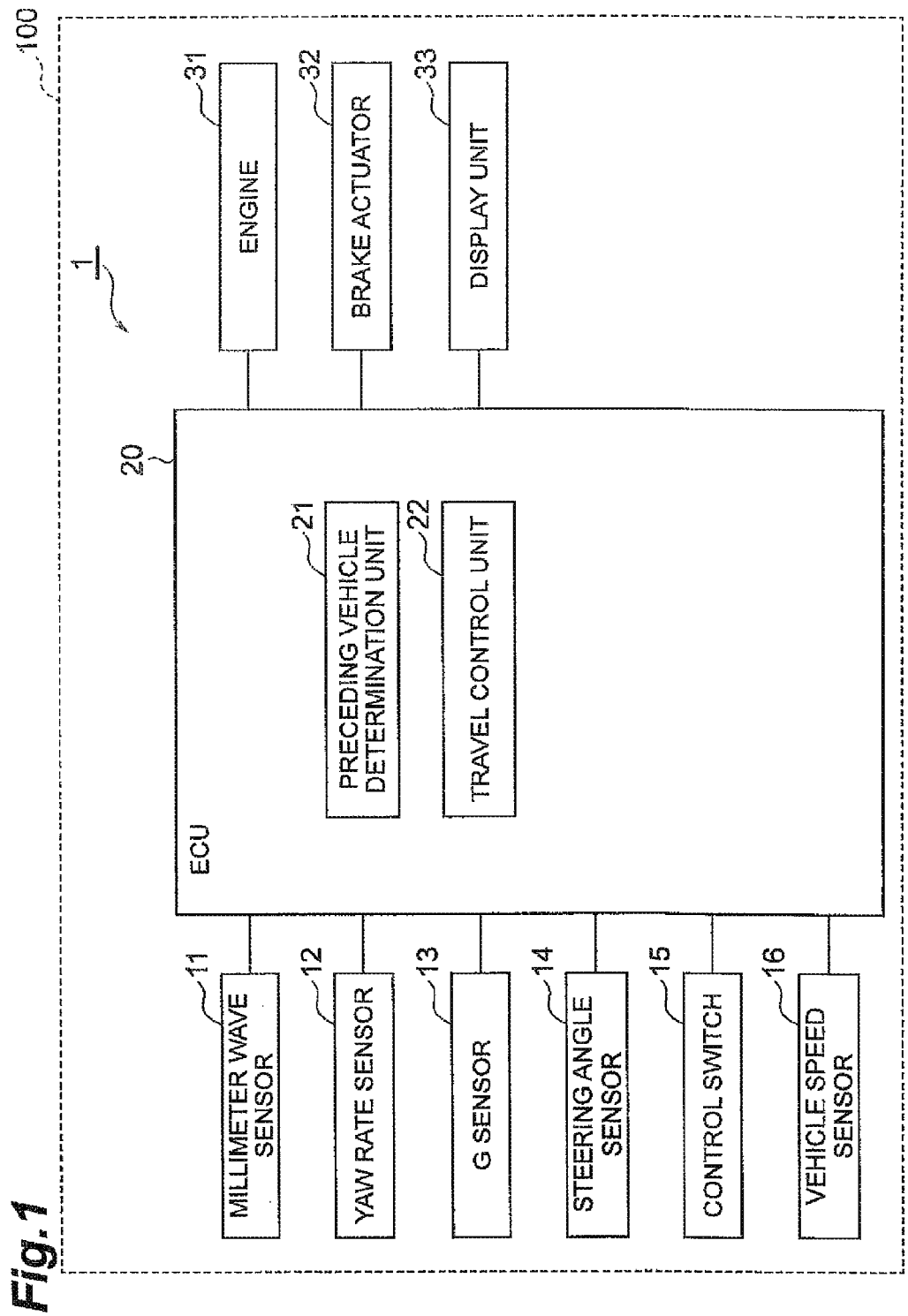
FIG. 1 is a block diagram of a vehicle travel control apparatus according to an embodiment of the present invention.

Hereinafter, a preferred embodiment of the present invention will be described with reference to the accompanying drawings. Meanwhile, in the following description, the same or corresponding components will be denoted by the same reference numerals and signs, and a repeated description will be omitted here.

As shown in FIG. 1, a vehicle travel control apparatus 1 according to this embodiment performs the travel control of a vehicle 100 on the basis of a positional relationship between the vehicle 100, which is a host vehicle, and a preceding vehicle traveling ahead of the vehicle 100, and performs following control with respect to a vehicle preceding the vehicle 100 when a preceding vehicle traveling directly ahead (for example, in the same lane as a lane in which the vehicle 100 is traveling) of the vehicle 100 is present. The vehicle travel control apparatus 1 is mounted on the vehicle 100. The vehicle travel control apparatus 1 is configured to include a millimeter wave sensor 11 that acquires target data of a preceding vehicle by receiving a reflected wave of an emitted electromagnetic wave, and an electronic control unit (ECU) 20 that performs the acceleration and deceleration control of the vehicle 100.

The millimeter wave sensor 11 functions as a radar detection unit that acquires target data of a preceding vehicle by receiving a reflected wave of an emitted electromagnetic wave. For example, the millimeter wave sensor 11, which is attached to the front of the vehicle 100, scans the side ahead of the vehicle 100 with an electromagnetic wave of a millimeter wave band and receives the electromagnetic wave reflected by a surface of an object which is present in the vicinity of the vehicle 100. Thus, the millimeter wave sensor 11 recognizes a target as a reflection point of the electromagnetic wave. In addition, the millimeter wave sensor 11 acquires target data (radar target) from transmitted and received data of a millimeter wave. The target data refers to position data of a target which is obtained from a direction and a distance of the target with respect to the vehicle 100, and includes the position of the target, a distance between the vehicle 100 and the target, relative speeds of the vehicle 100 and the target, and the like. The millimeter wave sensor 11 transmits the acquired target data to the ECU 20.

The ECU 20 includes a computer including, for example, a central processing unit (CPU), a read only memory (ROM), a random access memory (RAM), and the like, as its main components, and is configured to include an input signal circuit, an output signal circuit, and a power supply circuit. For example, in the ECU 20, an application stored in the ROM is loaded into the RAM and is executed in the CPU. The ECU 20 functions as a control unit that performs the acceleration and deceleration control of the vehicle 100 on the basis of the target data acquired by the millimeter wave sensor 11. The ECU 20 includes a preceding vehicle determination unit 21 that determines the presence or absence of a preceding vehicle that travels directly ahead of the vehicle 100, and a travel control unit 22 that performs the following control of the vehicle 100 with respect to the preceding vehicle. The preceding vehicle determination unit 21 and the travel control unit 22 are equivalent to the above-described application.

The preceding vehicle determination unit 21 has a function of determining whether a preceding vehicle is present ahead of the vehicle 100. Specifically, the preceding vehicle determination unit 21 has a function of acquiring detected point data of the preceding vehicle from the millimeter wave sensor 11 and of computing information such as the position of the preceding vehicle or the width of the preceding vehicle in a horizontal direction. In addition, the preceding vehicle determination unit 21 determines a target serving as a preceding vehicle on the basis of information obtained from a yaw rate sensor 12, a G sensor 13, a steering angle sensor 14, and a vehicle speed sensor 16 which are to be described later.

The travel control unit 22 performs following control with respect to the preceding vehicle of the vehicle 100 so that the vehicle 100 maintains an appropriate distance from the preceding vehicle. Specifically, when the preceding vehicle determination unit 21 determines that a preceding vehicle is present, the travel control unit 22 performs following control with respect to the preceding vehicle by performing the acceleration and deceleration of the vehicle 100 in accordance with the distance from the preceding vehicle. On the other hand, when the preceding vehicle determination unit 21 determines that a preceding vehicle is not present, for example, control for causing the vehicle 100 to travel at a constant set speed is performed.

The vehicle travel control apparatus 1 is configured to include various sensors, which are constituted by the yaw rate sensor 12, the G sensor 13, the steering angle sensor 14, the control switch 15, the vehicle speed sensor 16, and the like, in addition to the millimeter wave sensor 11 and the ECU 20 which are mentioned above, an engine 31, a brake actuator 32, and a display unit 33. The various sensors, the engine 31, the brake actuator 32, and the display unit 33, which are mentioned above, are connected to the ECU 20. In addition, the ECU 20 outputs a control signal to the engine 31, the brake actuator 32, and the display unit 33 to control operations of the engine 31, the brake actuator 32, and the display unit 33.

The yaw rate sensor 12 has a function of detecting a yaw rate of the vehicle 100. The yaw rate sensor 12 transmits the detected yaw rate as a yaw rate signal to the ECU 20.

The G sensor 13 has a function of detecting the acceleration and deceleration of the vehicle 100. The G sensor 13, which is provided, for example, at the front portion of the vehicle 100, detects the acceleration and deceleration of the vehicle 100 in a front-back direction and the acceleration and deceleration of the vehicle in a horizontal direction. The G sensor 13 transmits the detected acceleration and deceleration to the ECU 20.

The steering angle sensor 14 functions as a steering amount detection unit that detects a steering amount of a handle of the vehicle 100. For example, a sensor that detects a steering angle of a steering wheel, which is input by a driver, is used as the steering angle sensor 14. The steering angle sensor 14 transmits the detected steering angle as a steering angle signal to the ECU 20.

For example, the control switch 15 is configured to be capable of switching between turn-on and turn-off, and executes automatic travel control for following a preceding vehicle by being turned on. For example, the driver of the vehicle 100 executes automatic travel control by pressing the control switch 15.

The vehicle speed sensor 16 has a function of detecting the speed of the vehicle 100, and is provided, for example, in a wheel of the vehicle 100. For example, the vehicle speed sensor 16 detects a rotation speed of the wheel and calculates the speed of the vehicle 100 from the rotation speed. The vehicle speed sensor 16 transmits the calculated speed of the vehicle 100 to the ECU 20.

The engine 31 controls an accelerator opening of the vehicle 100 by using the control signal from the ECU 20. For example, the engine 31 prevents the preceding vehicle and the vehicle 100 from coming into contact with each other regardless of a driver's operation during the travel of the vehicle 100 by restricting the output thereof. Alternatively, the engine 31 may prevent the preceding vehicle and the vehicle 100 from coming into contact with each other by changing a speed reduction ratio of transmission.

The brake actuator 32 controls the brake opening of the vehicle 100 by using the control signal from the ECU 20. The brake actuator 32 controls the deceleration of the vehicle 100 by using the control signal from the ECU 20. Thus, the preceding vehicle and the vehicle 100 are prevented from coming into contact with each other, regardless of a driver's operation during the travel of the vehicle 100.

The display unit 33 is constituted by, for example, a display, a warning lamp, or the like. The display unit 33 displays information indicating that the preceding vehicle and the vehicle 100 are approaching each other, to the driver by using the control signal from the ECU 20. Thus, the preceding vehicle and the vehicle 100 are prevented from coming into contact with each other during the travel of the vehicle 100. Meanwhile, instead of using the display unit 33, the above-described information may be provided to the driver by increasing the tension of a seat belt of the driver, or for example, only the acceleration and deceleration of the vehicle 100 using the engine 31 and the brake actuator 32 may be performed.

Figure 4:
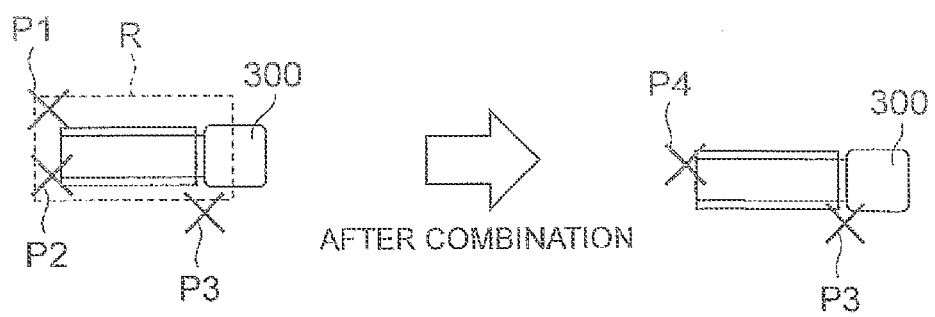
FIG. 4 is a diagram illustrating a cause of the occurrence of so-called target misidentification.
Figure 5:
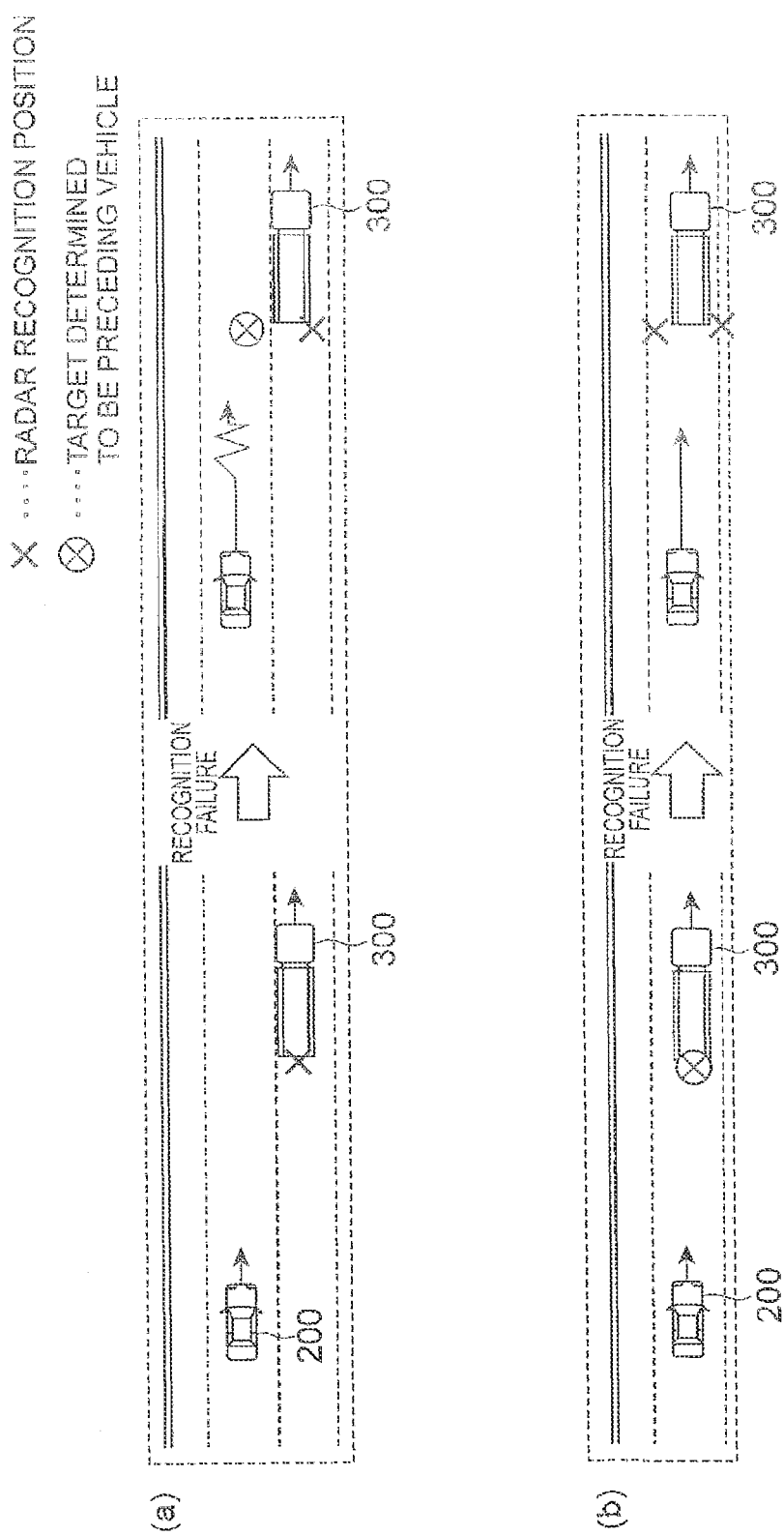
FIG. 5 is a diagram illustrating a problem of a travel control process in a vehicle travel control apparatus of the related art.

Here, a vehicle travel control apparatus of the related art will be described as a comparative example of the vehicle travel control apparatus 1 according to this embodiment. Hereinafter, as shown in FIGS. 4 and 5, a description will be given on the assumption that a vehicle including the vehicle travel control apparatus of the related art is a vehicle 200 and a vehicle traveling ahead of the vehicle 200 is a preceding vehicle 300. Similarly to the vehicle travel control apparatus 1, the vehicle travel control apparatus of the related art includes a millimeter wave sensor and has a function of acquiring target data of the preceding vehicle 300. Incidentally, in a case where target data is acquired using a radar detection unit such as a millimeter wave sensor, a plurality of pieces of target data are acquired with respect to the same object, and target misidentification may occur in which some of the plurality of pieces of target data are recognized as not being targets of a target object.

The target misidentification will be briefly described below. First, in the acquisition of target data using the radar detection unit, detected points acquired by the radar detection unit are combined with each other under predetermined conditions, and the position of a target, and the like are obtained as target data through the process of combining detected points. Here, for example, as shown in FIG. 4, three detected points P1, P2, and P3 of the preceding vehicle 300, which are obtained by the radar detection unit, and a combination range R are present. When the detected points P1 and P2 are included in the combination range R, whereas the detected point P3 is not included in the combination range R, two detected points P1 and P2 are combined with each other to be changed to a detected point P4. However, the detected point P3 is not included within the combination range R, and thus is not combined. Accordingly, all the detected points are not combined, a plurality of pieces of target data are obtained with respect to the same target, and some or all of the plurality of pieces of target data are recognized as not being targets of a target object. This phenomenon is target misidentification. The target misidentification particularly occurs when the preceding vehicle 300 is a large-sized vehicle. In addition, when the target misidentification occurs, a target may be recognized at a position shifted from the center of the preceding vehicle 300, which results in the following problem.

For example, in a case where the previous target data obtained by the radar detection unit is not recognized as a target of the preceding vehicle 300 and one of two pieces of current target data is recognized as a target of the preceding vehicle 300 when the vehicle 200 is traveling in a lane next to that of the preceding vehicle 300 as shown in FIG. 5(a), erroneous detection occurs in which the preceding vehicle 300 is recognized as a preceding vehicle traveling ahead of the vehicle 200, which results in a problem in that the vehicle 200 is decelerated in spite of the absence of the preceding vehicle.

On the other hand, in a case where the previous target data obtained by the radar detection unit is recognized as a target of the preceding vehicle 300 and all of two current pieces of target data are not recognized as targets of the preceding vehicle 300 when the vehicle 200 is traveling in the same lane as that of the preceding vehicle 300 as shown in FIG. 5(b), non-detection occurs in which the preceding vehicle 300 is recognized as not being the preceding vehicle of the vehicle 200, which results in a problem in that the vehicle 200 is accelerated in spite of the presence of the preceding vehicle.

In this manner, in a vehicle travel control apparatus of the related art, when target misidentification occurs, the vehicle 200 may be decelerated in spite of the absence of the preceding vehicle, or the vehicle 200 may be accelerated in spite of the presence of the preceding vehicle. Thus, following travel against a driver's wish is executed, which results in a problem in that an uncomfortable feeling is given to a driver.

Consequently, in the vehicle travel control apparatus 1 of this embodiment, an ECU 20 performs the acceleration and deceleration control of a vehicle 100 so as to suppress acceleration and deceleration when target misidentification occurs in which a plurality of pieces of target data are acquired with respect to the same object by a millimeter wave sensor 11. Unnecessary acceleration and deceleration is suppressed through the acceleration and deceleration control of the vehicle 100 which is performed by the ECU 20, and thus the above-described problem can be solved.

Figure 2:
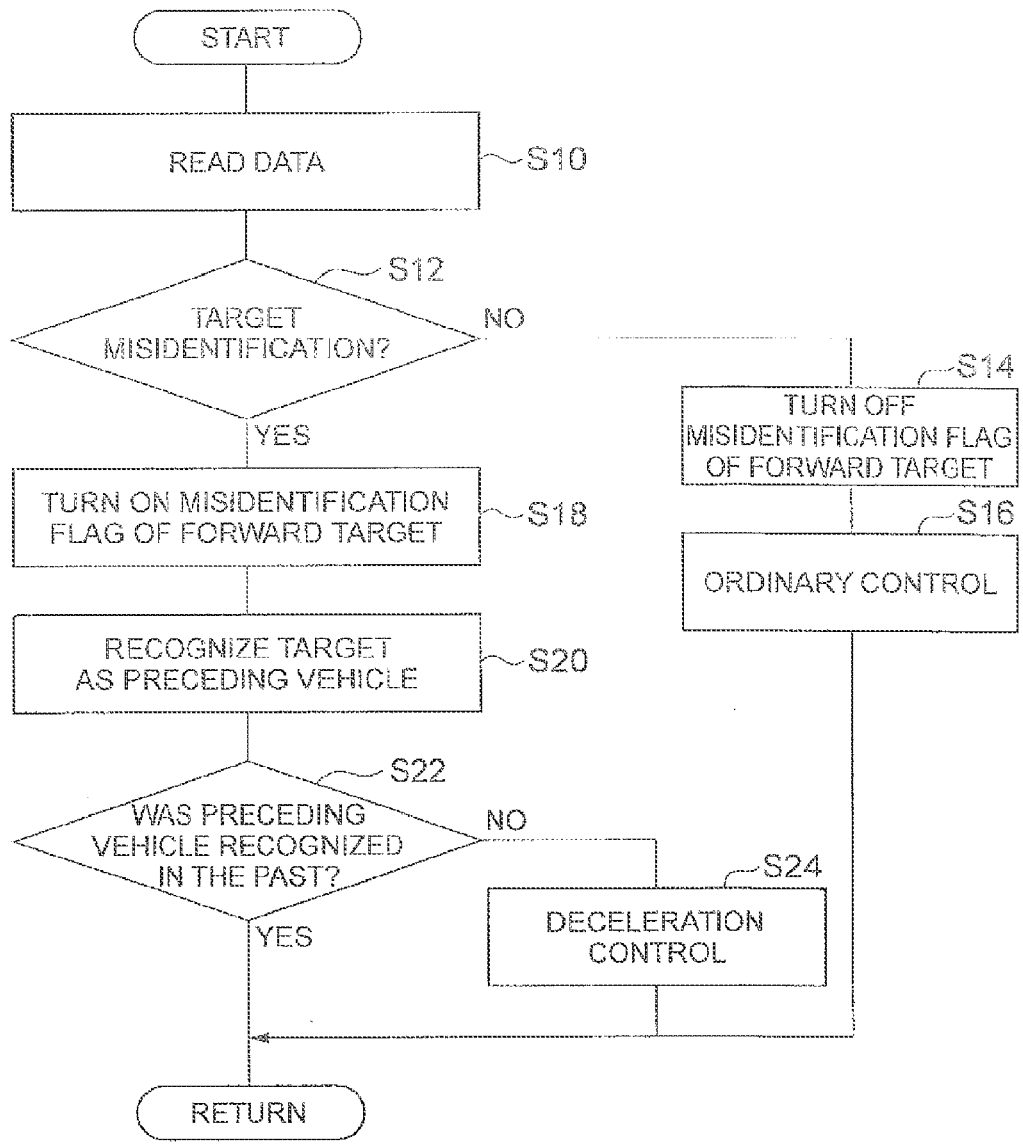
FIG. 2 is a flow chart showing a travel control process, when a preceding vehicle is erroneously detected, which is executed by the vehicle travel control apparatus of FIG. 1.
Figure 3:
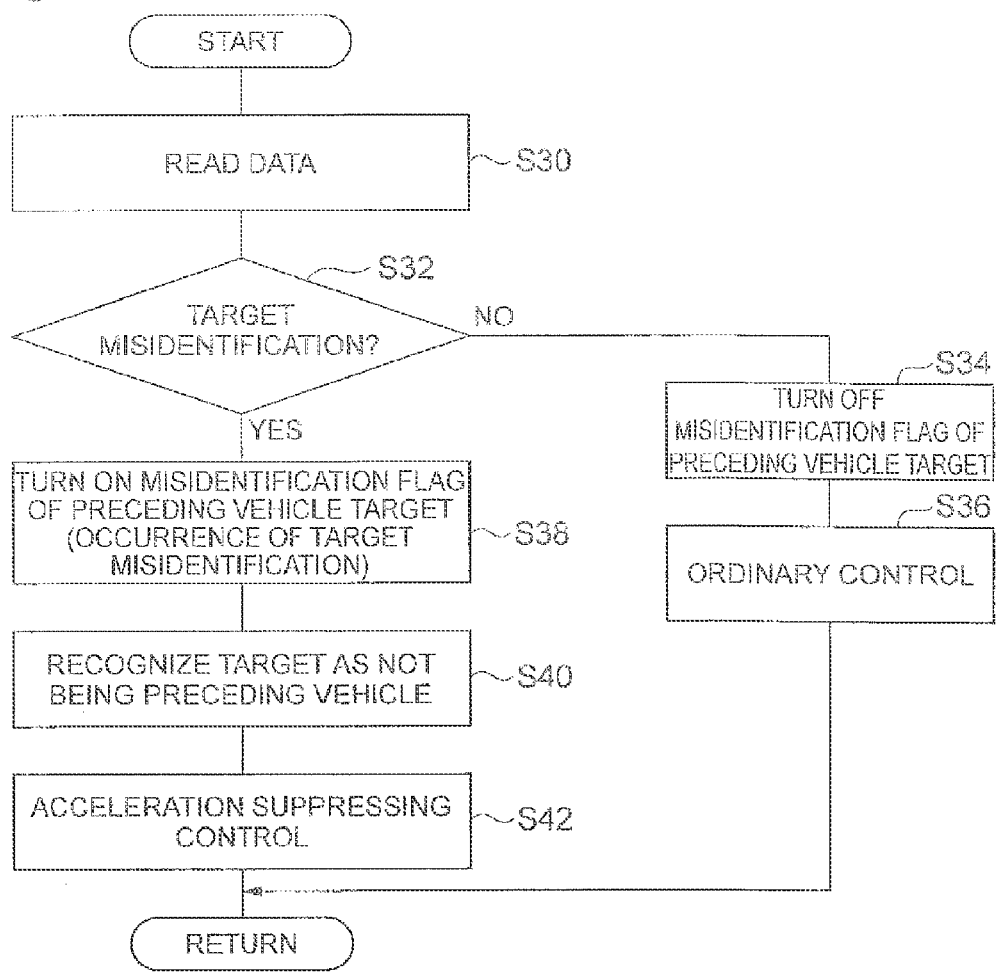
FIG. 3 is a flow chart showing a travel control process, when a preceding vehicle is not detected, which is executed by the vehicle travel control apparatus of FIG. 1.

Next, operations of the vehicle travel control apparatus 1 of this embodiment which performs the above-described acceleration and deceleration control will be described with reference to FIGS. 2 and 3. For example, processes shown in FIGS. 2 and 3 are travel control processes that are executed by the ECU 20 at predetermined time intervals when a control switch 15 is turned on by a driver of the vehicle 100. FIG. 2 shows a deceleration control process, and FIG. 3 shows an acceleration control process. Meanwhile, the process of FIG. 2 may be repeatedly executed in a situation where the erroneous detection of a preceding vehicle occurs, for example, as shown in FIG. 5(a), and the process of FIG. 3 may be repeatedly executed in a situation where the non-detection of a preceding vehicle occurs, for example, as shown in FIG. 5(b).

The deceleration control process shown in FIG. 2 will be described below. First, when target misidentification occurs, the reading of data obtained by various sensors such as the millimeter wave sensor 11 is executed by the ECU 20 in step S10 (hereinafter, referred to as "S10", the same is true of other steps). Then, the process proceeds to S12, and it is determined whether target misidentification has occurred. Specifically, a plurality of pieces of target data are obtained by the millimeter wave sensor 11, and it is determined whether some of the plurality of pieces of target data obtained by a preceding vehicle determination unit 21 have been recognized as not being targets of the preceding vehicle. Then, when it is determined that target misidentification has not occurred in S12, the process proceeds to S14, and a flag update process of turning off a misidentification flag of a forward target is performed by the ECU 20. Thereafter, the process proceeds to S16, and ordinary following control is performed with respect to the preceding vehicle by a travel control unit 22, and then a series of processes are terminated.

On the other hand, when it is determined that target misidentification has occurred in S12, the process proceeds to S18, and a flag update process of turning on a misidentification flag of a forward target is executed by the ECU 20. Then, the process proceeds to S20, and the preceding vehicle determination unit 21 determines that a preceding vehicle is present, and then the ECU 20 determines whether the preceding vehicle determination unit 21 recognized a preceding vehicle in the past (S22). Then, when it is determined that the preceding vehicle determination unit 21 recognized a preceding vehicle in the past, the ECU 20 determines that the preceding vehicle has been detected and performs a process of decelerating the vehicle 100. At this time, for example, the ECU 20 outputs a control signal to a brake actuator 32 and a display unit 33, and causes the brake actuator 32 to operate a brake and causes the display unit 33 to display information indicating that a preceding vehicle is present. Then, a series of processes are terminated.

On the other hand, when it is determined that the preceding vehicle determination unit 21 did not recognize a preceding vehicle in the past in S22, the ECU 20 determines that erroneous detection has occurred. Then, the process proceeds to S24 and executes a deceleration suppressing process of the vehicle 100. At this time, for example, the ECU 20 outputs a control signal to the brake actuator 32 and the display unit 33, and causes the brake actuator 32 to suppress a brake operation and causes the display unit 33 to display information indicating that a preceding vehicle is not present. Then, the execution of the deceleration suppressing process is started, and a predetermined period of time elapses, and then a series of processes are terminated.

Hereinafter, an acceleration control process shown in FIG. 3 will be described. First, the reading of data obtained by various sensors such as the millimeter wave sensor 11 is executed by the ECU 20 in step S30. Then, the process proceeds to S32, and it is determined whether target misidentification has occurred. Specifically, a plurality of pieces of target data are obtained by the millimeter wave sensor 11, and the preceding vehicle determination unit 21 determines whether all of a plurality of pieces of target data have been recognized as not being targets of a preceding vehicle. Then, when it is determined in S32 that target misidentification has not occurred, the process proceeds to S34, and a flag update process of turning off a misidentification flag of a preceding vehicle target is performed by the ECU 20. Thereafter, the process proceeds to S36, and ordinary following control is performed with respect to the preceding vehicle by the travel control unit 22, and then a series of processes are terminated.

On the other hand, in S32, when target misidentification occurs after the preceding vehicle determination unit 21 recognizes the preceding vehicle, a flag update process for turning on a misidentification flag of a preceding vehicle target is executed by the ECU 20 in S38. Then, the process proceeds to S40, and the preceding vehicle determination unit 21 determines that a preceding vehicle is not present, and then the ECU 20 determines that non-detection has occurred. Then, the process proceeds to S42, and the acceleration suppressing process of the vehicle 100 is executed. At this time, for example, the ECU 20 outputs a control signal to an engine 31, and suppresses the acceleration of the vehicle 100 by using the engine 31. Thereafter, the preceding vehicle determination unit 21 determines that a preceding vehicle is present in front of the vehicle 100. Thus, the execution of the acceleration suppressing process is started, and a predetermined period of time elapses, and then the acceleration suppressing process is canceled. Then, a series of processes are terminated.

As described above, the vehicle travel control apparatus 1 of this embodiment, which is mounted on the vehicle 100, performs the travel control of the vehicle 100 on the basis of a positional relationship between the vehicle 100 and a preceding vehicle traveling ahead of the vehicle 100. The vehicle travel control apparatus 1 includes the millimeter wave sensor 11 that acquires target data of a preceding vehicle by receiving a reflected wave of an emitted electromagnetic wave, and the ECU 20 that determines the presence or absence of a preceding vehicle traveling directly ahead of the vehicle 100 from the target data acquired by the millimeter wave sensor 11 and performs the acceleration and deceleration control of the vehicle 100 on the basis of the presence or absence of the preceding vehicle. The ECU 20 performs the acceleration and deceleration control of the vehicle 100 so as to suppress acceleration and deceleration when target misidentification occurs in which a plurality of pieces of target data are acquired with respect to the same object by the millimeter wave sensor 11.

As described above, in this embodiment, the acceleration and deceleration of the vehicle 100 is suppressed when target misidentification occurs in which a plurality of pieces of target data are acquired with respect to the same object. Accordingly, it is possible to reduce a driver's uncomfortable feeling by appropriately performing the travel control of the vehicle 100 even when the erroneous detection or non-detection of a preceding vehicle occurs due to target misidentification.

In the vehicle travel control apparatus 1, the ECU 20 performs the acceleration and deceleration control of the vehicle 100 so as to suppress deceleration when target misidentification occurs and when it is determined that a preceding vehicle is currently present and that a preceding vehicle was not previously present. Accordingly, when there is a high possibility of the occurrence of the erroneous detection of a preceding vehicle in which it is determined that a preceding vehicle is currently present and that a preceding vehicle was not previously present, the deceleration of the vehicle 100 is suppressed. Therefore, it is possible to reduce a driver's uncomfortable feeling by appropriately performing travel control.

In the vehicle travel control apparatus 1, the ECU 20 performs the acceleration and deceleration control of the vehicle 100 so as to suppress acceleration when target misidentification occurs and when it is determined that a preceding vehicle is not currently present and that a preceding vehicle was previously present. Accordingly, when there is a high possibility of the occurrence of the non-detection of a preceding vehicle in which it is determined that a preceding vehicle is not currently present and that a preceding vehicle was previously present, the acceleration of the vehicle 100 is suppressed. Therefore, it is possible to reduce a driver's uncomfortable feeling by appropriately performing travel control.

Meanwhile, the above-described embodiment describes an embodiment of a vehicle travel control apparatus according to the present invention, but the vehicle travel control apparatus according to the present invention is not limited to that described in this embodiment. The vehicle travel control apparatus according to the present invention may also include a modification of the vehicle travel control apparatus according to this embodiment so as not to change the gist described in each claim, or may also be applied to others.

For example, in the above-described embodiment, as shown in S10 of FIG. 2 and S30 of FIG. 3, an example in which the occurrence of target misidentification is shown using a flag has been described. However, a flag may not be used in order to show target misidentification, and the occurrence of target misidentification may be handled using another method.

In the above-described embodiment, a description has been given of an example in which the deceleration control of the vehicle 100 is executed when the erroneous detection of a preceding vehicle occurs in association with the occurrence of target misidentification and in which the acceleration control of the vehicle 100 is executed when the non-detection of a preceding vehicle occurs. However, the present invention is not limited to this example. For example, the acceleration and deceleration of the vehicle 100 may be suppressed, under conditions in which target misidentification has occurred.

In the above-described embodiment, a description has been given of an example in which the millimeter wave sensor 11 is used. However, a sensor having a different wavelength band such as a sensor using a microwave or a submillimeter wave may be used instead of the millimeter wave sensor 11.

INDUSTRIAL APPLICABILITY

The present invention can be used as a vehicle travel control apparatus which is mounted on a vehicle.

REFERENCE SIGNS LIST 1 vehicle travel control apparatus
11 millimeter wave sensor
12 yaw rate sensor
13 G sensor
14 steering angle sensor
15 control switch
16 vehicle speed sensor
20 ECU
21 preceding vehicle determination unit
31 engine
32 brake actuator
33 display unit
100 vehicle

The invention claimed is:

1. A vehicle travel control apparatus, mounted on a host vehicle, which performs
   travel control of the host vehicle on the basis of a positional relationship between the host vehicle and a preceding vehicle traveling ahead of the host vehicle, the apparatus comprising:
   a radar detection unit that acquires target data of the preceding vehicle by receiving a reflected wave of an emitted electromagnetic wave; and
   a control unit that determines presence or absence of a preceding vehicle traveling directly ahead of the host vehicle from the target data acquired by the radar detection unit and performs acceleration and deceleration control of the host vehicle on the basis of the presence or absence of the preceding vehicle, the control unit performing the acceleration and deceleration control of the host vehicle so as to suppress acceleration and deceleration when target misidentification occurs in which a plurality of pieces of target data are acquired with respect to the same object by the radar detection unit,
   wherein the control unit performs the acceleration and deceleration control of the host vehicle so as to suppress deceleration in a case where it is erroneously determined based on the target data acquired by the radar detection unit that the preceding vehicle is currently present and that a preceding vehicle was not previously present when the target misidentification occurs,
   wherein the control unit performs the acceleration and deceleration control of the host vehicle so as to suppress acceleration in a case where it is erroneously determined based on the target data acquired by the radar detection unit that the preceding vehicle is not currently present and that the preceding vehicle was previously present when the target misidentification occurs.

* * * * *